US007489697B2

United States Patent
Choi et al.

(10) Patent No.: US 7,489,697 B2
(45) Date of Patent: Feb. 10, 2009

(54) IEEE 1394-BASED UNIDIRECTIONAL RING SYSTEM FOR INDOOR BACKBONE NETWORK

(75) Inventors: Do-In Choi, Yongin-si (KR); Lae-Kyoung Kim, Suwon-si (KR); Hee-Won Cheung, Suwon-si (KR); Yun-Je Oh, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 826 days.

(21) Appl. No.: 10/798,165

(22) Filed: Mar. 11, 2004

(65) Prior Publication Data
US 2005/0030902 A1 Feb. 10, 2005

(30) Foreign Application Priority Data
Aug. 6, 2003 (KR) .................. 10-2003-0054398

(51) Int. Cl.
*H04L 12/28* (2006.01)
*H04L 12/56* (2006.01)

(52) U.S. Cl. .................................................. 370/401
(58) Field of Classification Search ................ 370/401, 370/403–404
See application file for complete search history.

(56) References Cited

U.S. PATENT DOCUMENTS

| 6,597,665 B1 | 7/2003 | Van Loo et al. | ............. | 370/252 |
| 6,611,537 B1 * | 8/2003 | Edens et al. | ................. | 370/503 |
| 2002/0021465 A1 | 2/2002 | Moore, Jr. et al. | | |

FOREIGN PATENT DOCUMENTS

| EP | 0054077 | 6/1982 |
| JP | 57-129051 | 8/1982 |
| JP | 01-130276 | 5/1989 |
| JP | 03-206751 | 9/1991 |
| JP | 10-164140 | 6/1998 |
| JP | 11-004238 | 1/1999 |
| WO | WO 03/036877 | 5/2003 |

OTHER PUBLICATIONS

"Fire on the Wire: The IEEE 1394 High Performance Serial Bus;" Roger Jennings; http://www.adaptec.com; Jan. 31, 1997; XP002087275; 7 pgs.
"The Scalable Coherent Interface and Related Standards Projects;" David B. Gustavson; IEEE Micro, IEEE Inc., New York, vol. 12, No. 1; Feb. 1, 1992; XP000257464; 12pgs.

* cited by examiner

*Primary Examiner*—Kevin C Harper
(74) *Attorney, Agent, or Firm*—Cha & Reiter, LLC

(57) ABSTRACT

An IEEE 1394-based unidirectional ring system for an indoor backbone network is disclosed. In the ring system, an RG is used for connection to an external large-capacity network, and an SG is connected to the RG. The SG functions as a clock master to synchronize whole clock signals in the system, manages traffic in the indoor backbone network, manages buses in the indoor backbone network, and monitors the physical states of transmission lines in indoor backbone network. The SG and the SPs form a unidirectional ring structure. A plurality of SPs is configured to load the user data over the indoor backbone network or extract user-desired data from the indoor backbone network to provide user-desired services to a user.

9 Claims, 13 Drawing Sheets

IEEE 1394-BASED UNIDIRECTIONAL RING SYSTEM FOR INDOOR BACKBONE NETWORK

CLAIM OF PRIORITY

This application claims priority under 35 U.S.C. § 119 to an application entitled "IEEE 1394-Based Unidirectional Ring System for Indoor Backbone Network," filed in the Korean Intellectual Property Office on Aug. 6, 2003 and assigned Serial No. 2003-54398, the contents of which are incorporated herein by reference.

BACKGROUND OF THE INVENTION

1. Field of the Invention

The present invention relates generally to a home network solution, and in particular, to a backbone home network configuration based on the IEEE (Institute of Electrical and Electronics Engineers) 1394 standard.

2. Description of the Related Art

Existing transmission techniques proposed to be used in a home network include: Ethernet, cable wires, home PNA (Phoneline Networking Alliance), IEEE 1394, and WLL (Wireless Local Loop). Sufficient bandwidth and QoS (Quality of Service) guarantee are important factors in the multimedia transmission. To this end, the IEEE 1394 is well known as the best scheme that can satisfy these requirements and highly likely to be adopted as the standard for the current home network solutions.

FIG. 1 illustrates a typical IEEE 1394 daisy-chain configuration. As shown, the IEEE 1394 is a transmission standard based on a tree topology in which all devices are connected to one another in a daisy-chain fashion. In particular, the IEEE 1394 daisy chain is configured to include a gateway 100 for connection to a higher network, sockets 101-1, 101-2 and 101-3 for connection to the lower cluster networks, and the cluster networks. Each cluster network comprises a branch node(s) 102-1, 102-2, 102-3 or 102-4 and a leaf node 103-1, 103-2 or 103-3.

The IEEE 1394 is designed in such a manner so that real-time isochronous transmission and asynchronous transmission can be carried out simultaneously with automatic setting, plug & play, and hot plug functions. Hence, it is an ideal to the household application that demands various types of data and convenience.

FIG. 2 illustrates an exemplary bus reset that occurs when a device is removed in the IEEE 1394 daisy-chain configuration between a PC (Personal Computer) and its peripheral devices. As shown in FIG. 2, the IEEE 1394 undergoes reset and reconfiguration of all nodes connected to a bus unit whenever an event occurs, such as power-on/off or addition/removal of a device (serving as a node) connected to the unit bus. As a result, frequent addition and removal of a product, such as a digital camcorder, in the household significantly impairs the overall stability of a system.

For example, if a device 2 moves from position 22 to position 23 in a daisy-chain structure with device 1 (21), device 2 (22) and device 3(24), all nodes connected to each bus, namely device 1 and device 3 needs to be reset and reconfigured. At the same time, data is abruptly disconnected from lower-layer device 3, thus incurring data loss.

To activate a device acting as a leaf node, its branch node must be turned on. As the devices are connected to a service gateway (SG) serving as a central station by transmission lines in a one-to-one correspondence in the conventional tree topology, the cable installation cost increases with the size of an indoor area. In addition, the number of optical transceivers is increased which dominates the cost of the whole system in a 400 or higher-Mbps indoor network, thereby imposing cost constraints.

SUMMARY OF THE INVENTION

It is, therefore, an object of the present invention to provide an IEEE 1394-based unidirectional ring topology using service platforms (SPs) for configuring a stable indoor network that is independent of the IEEE 1394 services and events.

It is another object of the present invention to provide a built-in backbone network having a ring topology in which devices are not daisy-chained under a household environment.

It is a further object of the present invention to provide a novel unidirectional ring topology that is improved from the conventional IEEE 1394-based tree topology for reducing the total system building cost.

In one aspect of the invention, an IEEE 1394-based unidirectional ring system for an indoor backbone network is disclosed. In the ring system, an RG is used for connection to an external large-capacity network, and an SG is connected to the RG The SG functions as a clock master to synchronize whole clock signals in the system, manages traffic in the indoor backbone network, manages buses in the indoor backbone network, and monitors the physical states of transmission lines in indoor backbone network. A plurality of SPs loads user data over the indoor backbone network, or extract the user-desired data from the indoor backbone network, thereby providing user-desired services to a user. The SG and the SPs form a unidirectional ring structure.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail as they would obscure the invention in unnecessary detail.

Figure 3:
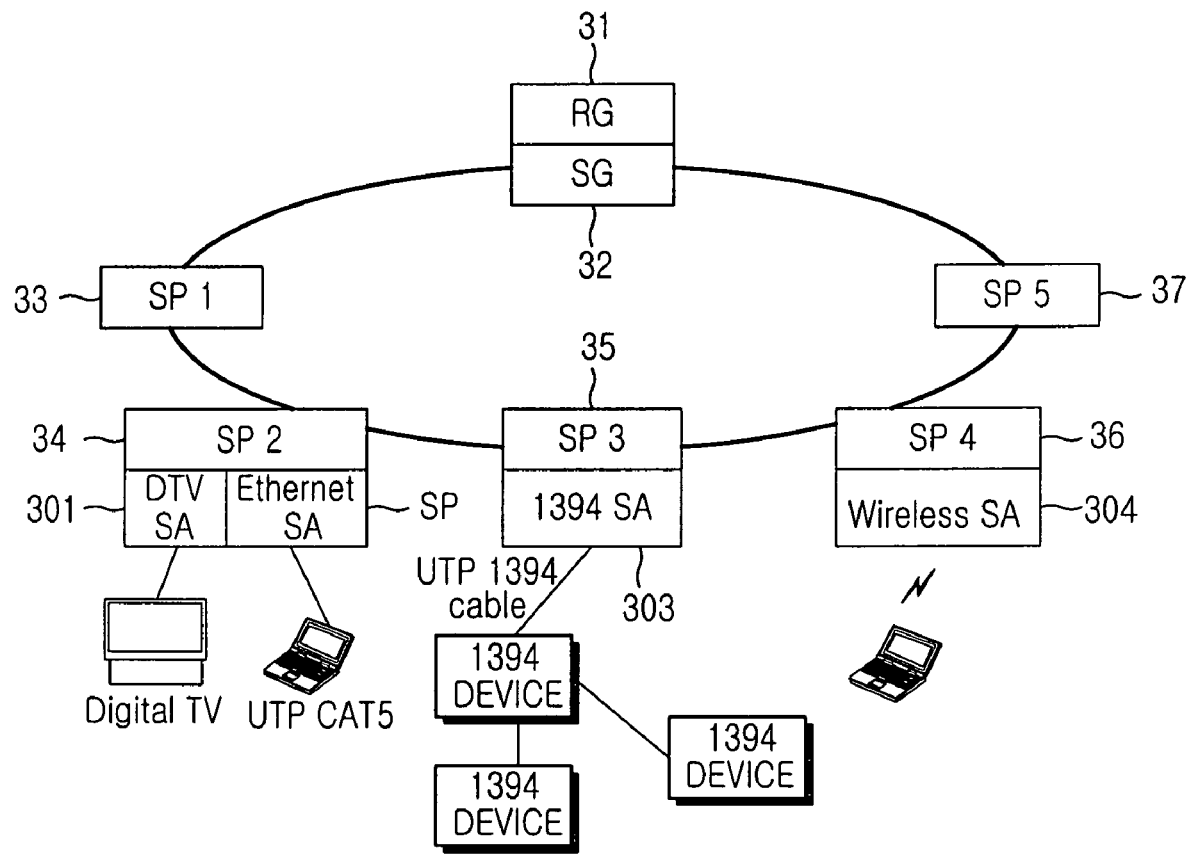
FIG. 3 illustrates the configuration of an IEEE 1394-based high-rate unidirectional ring system for an indoor backbone network according to an embodiment of the present invention.

FIG. 3 illustrates an IEEE 1394-based high-rate unidirectional ring system that may be used in an indoor backbone network according to an embodiment of the present invention.

As shown in FIG. 3, to overcome problems encountered in the conventional IEEE 1394 tree topology in which each device is rendered to serve as a node in a network, a stable indoor backbone network according to the present invention is provided with an SG 32 and common SPs 33 to 37.

In operation, the SG 32 functions as a clock master for synchronizing whole clock signals, manages traffic within the indoor backbone, and monitors the physical states of transmission lines in the IEEE 1394-based high-rate unidirectional ring system.

The SPs 33 to 37 (SP 1 to SP 5) are platforms that provide actual user-desired services. They are responsible for loading the user data on the backbone network or extracting the user-desired data from the backbone network. The SPs 33 to 37 are designed so that their operations are independent of the events and services in an arbitrarily user-built cluster network. Hence, the SPs serve to separate the indoor backbone network from the cluster networks to perform as independent networks.

In more detail, a higher-layer subscriber network, such as FTTH (Fiber To The Home) or VDSL (Very High data rate Digital Subscriber Line), is connected via an RG (Residential gateway) 31, and the user cluster networks are connected via SAs (Service Adapters) using SP 1 to SP 5. SAs 301 to 304 may be added to or removed from the SPs 33 to 37. Thus, as the user purchases a corresponding SA, he or she can receive an intended service irrespective of the time and place.

That is, the SG 32 and the SPs 33 to 37 form the IEEE 1394-based backbone network, and the desired services are provided by adding the appropriate SAs to the SPs 33 to 37. Compare to the conventional daisy-chained network structure, user-selected service devices are connected to the backbone network via the SPs 33 to 37 without influencing the configuration of the network. As a result, events such as on/off or addition/removal of devices have no influence on the network. This will be described in more details with reference to FIG. 4.

Figure 4:
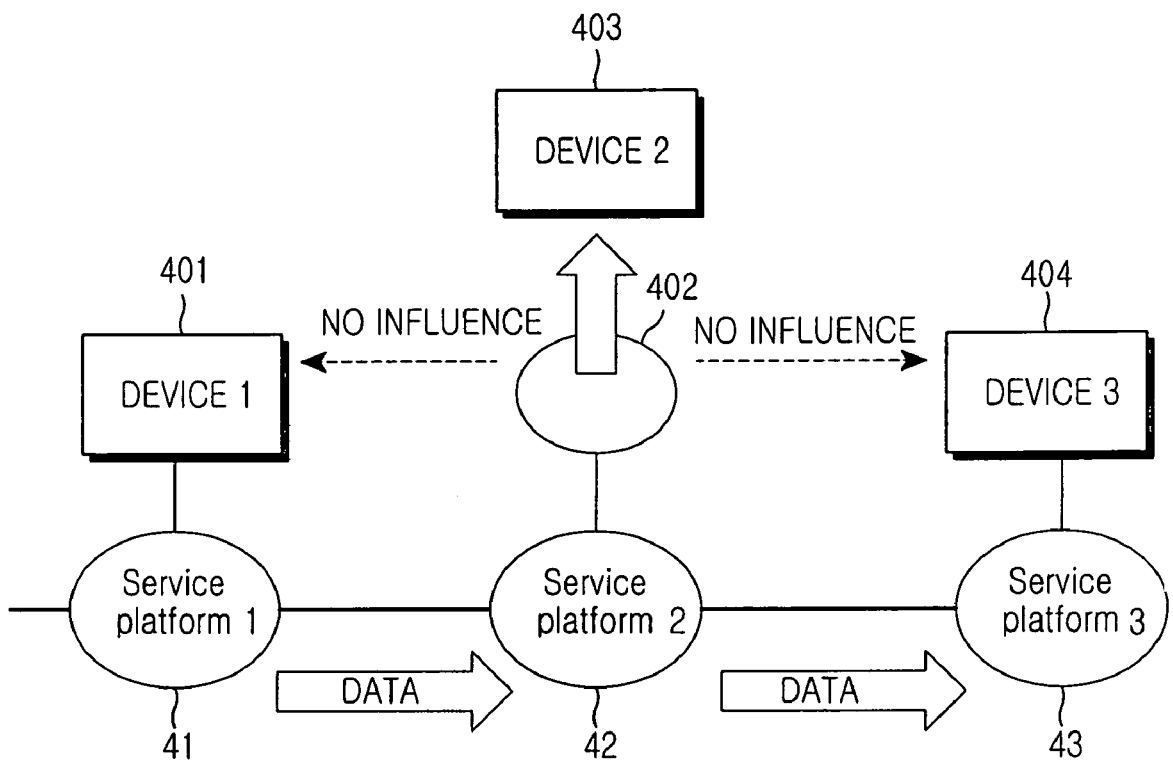
FIG. 4 depicts a removal of a device in the backbone network using IEEE 1394 SPs according to the embodiment of the present invention.

FIG. 4 depicts a device removal occurring in the backbone network using the IEEE 1394 SPs according to the embodiment of the present invention.

Figure 1:
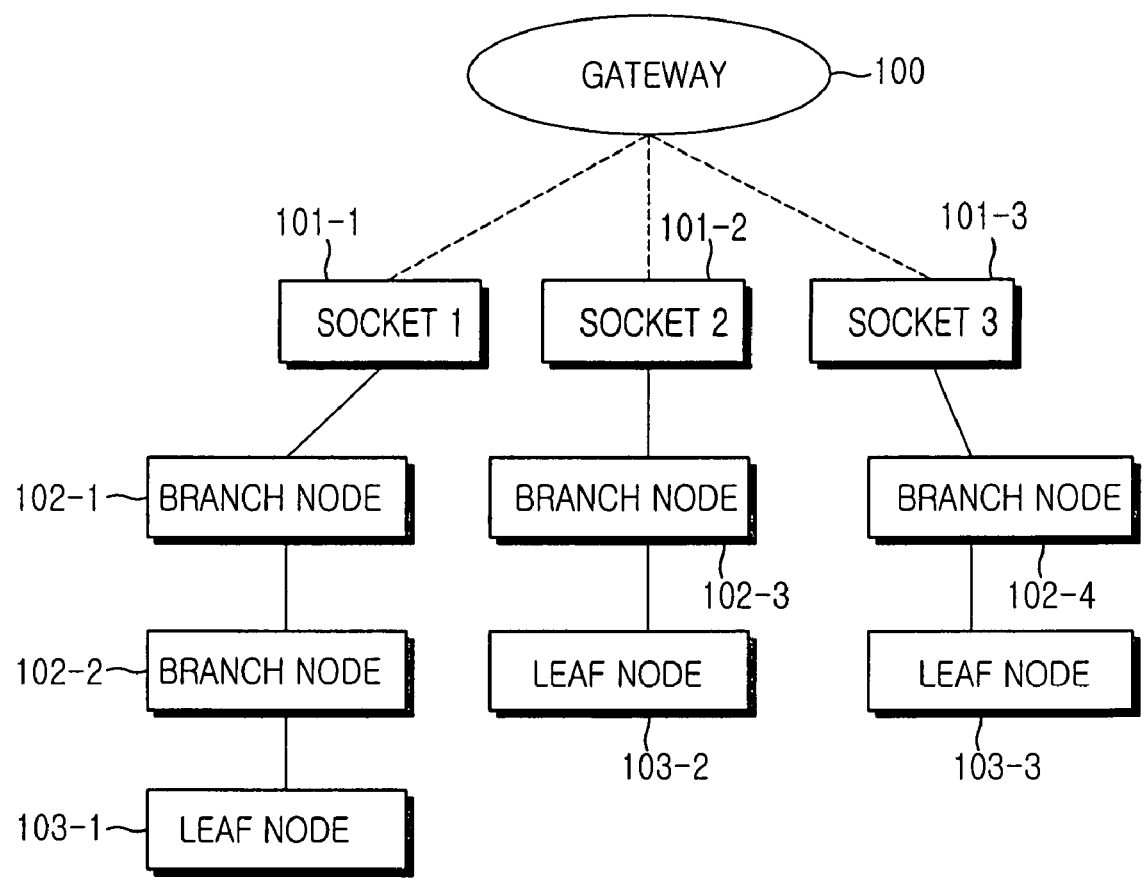
FIG. 1 illustrates a conventional IEEE 1394 daisy-chain configuration.
Figure 2:
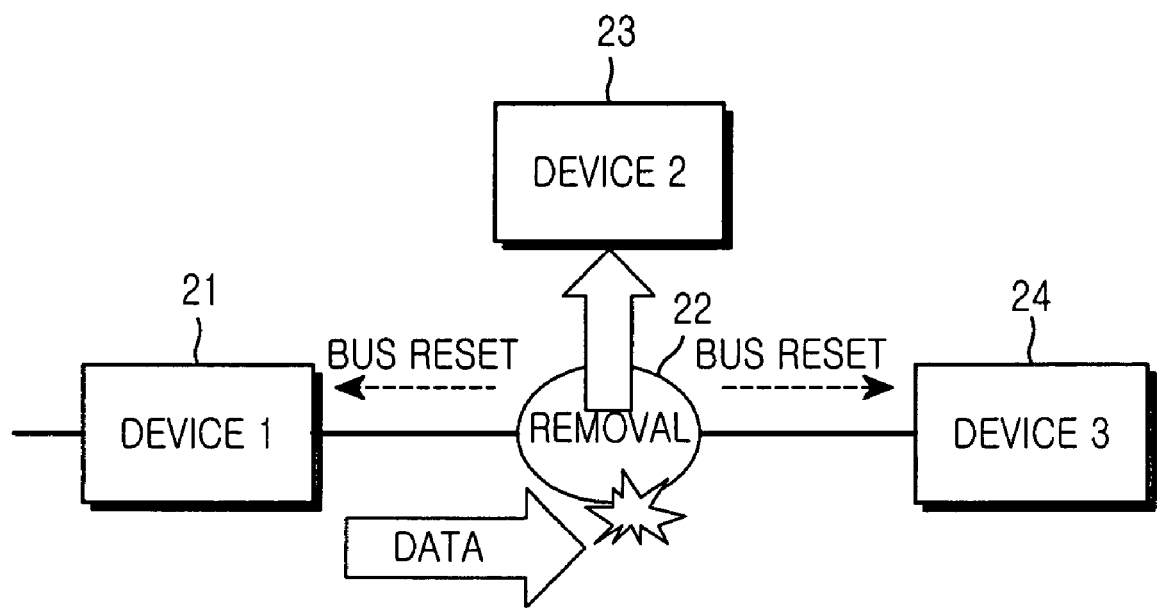
FIG. 2 illustrates an exemplary bus reset that occurs when a device is removed in the conventional IEEE 1394 daisy-chain configuration.

Compared to the tree topology relying on daisy-chained devices illustrated in FIG. 2, the overall data flows are carried out via respective SPs 41, 42 and 43 and optical lines connecting them. As such, even if one 402 of devices 401, 402 and 404 connected to the SPs 41, 42 and 43 is removed to position 403, this does not affect the data flow and configuration of the backbone network.

The SP function is significant in that the individual SPs are independent of the other SPs irrespective of the events and services, thus forming a stable network. That is, the IEEE 1394 automatically assigns an ID to an added/removed node by an event process called, a bus reset. In a household environment, a user frequently turns on/off multimedia devices and inserts/removes mobile devices to/from a network. In the prior art, if the event occurs at each of these events in the backbone network, data may be lost during transmission, thus making it difficult to configure a stable backbone network. To address this, the backbone network according to the present invention is kept stable by maintaining SPs in an on state, i.e., by building the SPs in a place, such as walls in the household.

Figure 5:
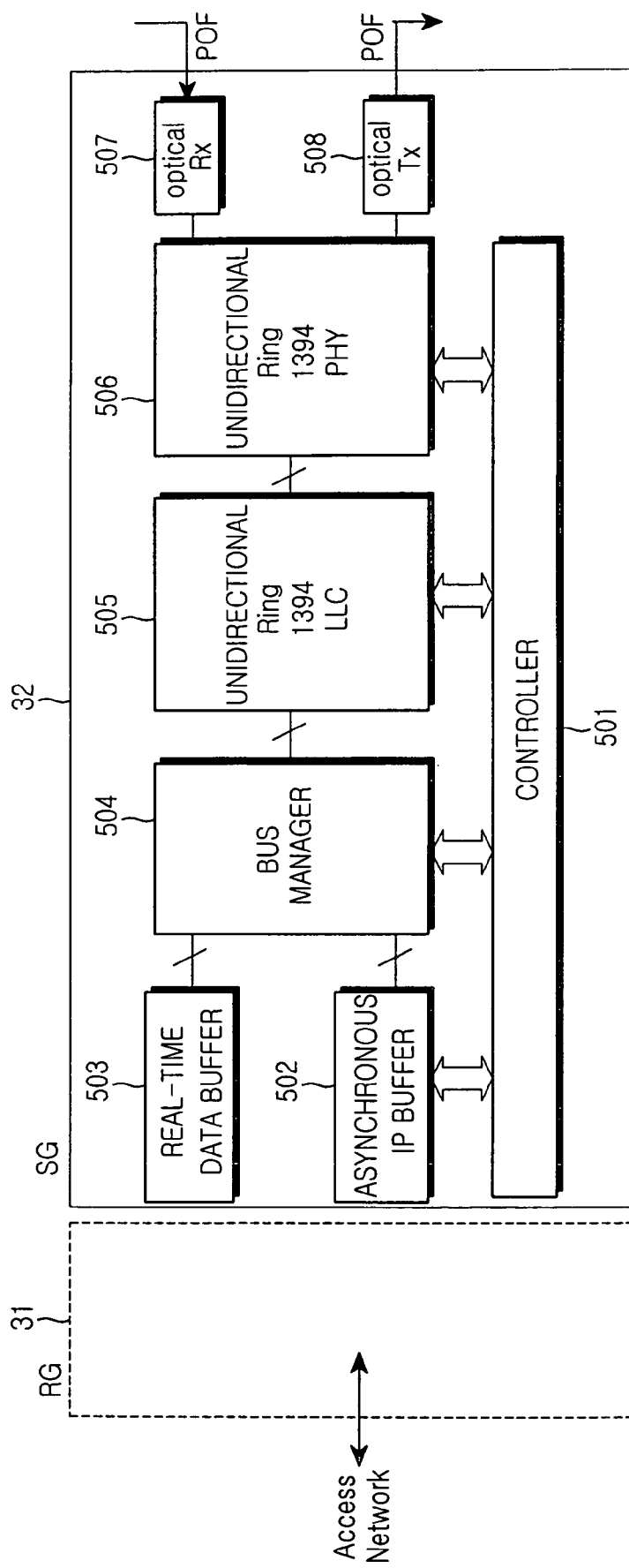
FIG. 5 is a block diagram of an SG according to the embodiment of the present invention.

FIG. 5 is a block diagram of the SG according to the embodiment of the present invention.

As shown in FIG. 5, the SG 32 comprises an asynchronous IP (Internet Protocol) buffer 502 for performing the IP data transmission to transmit data received from the RG 31 to the respective SPs 33 to 37 in the backbone network; a real-time data buffer 503 for converting the received data into IEEE 1394 data; a bus manager 504 for managing buses in the network; a unidirectional ring 1394 LLC (Logical Link Control) unit 505 and a unidirectional ring 1394 PHY unit 506 for IEEE 1394 data conversion; an optical receiver (Rx) 507 for receiving light; an optical transmitter (Tx) 508 for transmitting light; and a controller 501 for controlling each function block, serving as a clock master to synchronize all clock signals in the high-rate unidirectional ring system, managing traffic in the indoor backbone network, and monitoring the physical states of transmission lines.

Figure 6:
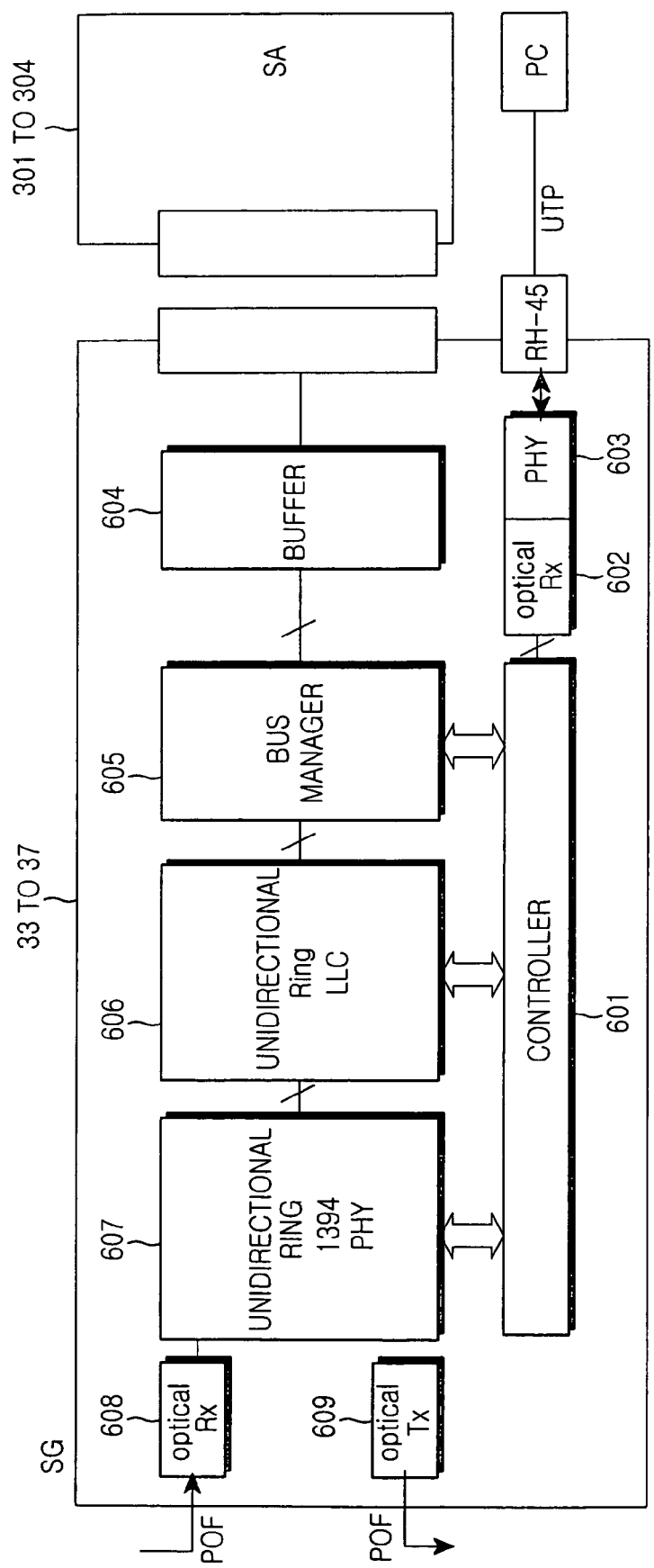
FIG. 6 is a block diagram of an SP according to the embodiment of the present invention.

FIG. 6 is a block diagram of the SP according to the embodiment of the present invention.

As shown in FIG. 6, each of the SPs 33 to 37 includes an optical Rx 608 for receiving data over the backbone network; a unidirectional ring LLC unit 606 and a unidirectional ring PHY unit 607 for converting an optical signal received from the optical Rx 608 to IEEE 1394 data, copying a necessary part of the IEEE 1394 data, transmitting the copy to a function block inside the SP, encapsulating data directed to another SP in the IEEE 1394 data, and transmitting the encapsulated data to an optical Tx 609; a bus manager 605 for managing buses in the network; a buffer 604 for interfacing data with the SA 301, 302, 303 or 304, a MAC (Media Access Control) unit 602 and a PHY unit 603 for communication with an IP terminal over UTP (Unshielded Twisted Pair); and a controller 601 for controlling each function block.

As illustrated in FIG. 6, the SP performs functions for the MAC layer and its higher layers. An IEEE 1394 frame's decapsulated data is various in type, such as MPEG2 (Motion Picture Experts Group 2), DV (Digital Video), and IP. Therefore, the SAs may be developed to be equipped with the function of receiving such data and processing it as requested by a user. For example, the user can view general TV broadcasting by purchasing the SA 301 supporting MPEG2 decoding and connecting the SA 301 to the SP. Also, if the user wants the conventional IEEE 1394 daisy-chain configuration, he or she has to purchase the SA 303 supporting a 1394 port and thus form his or her network.

Figure 7:
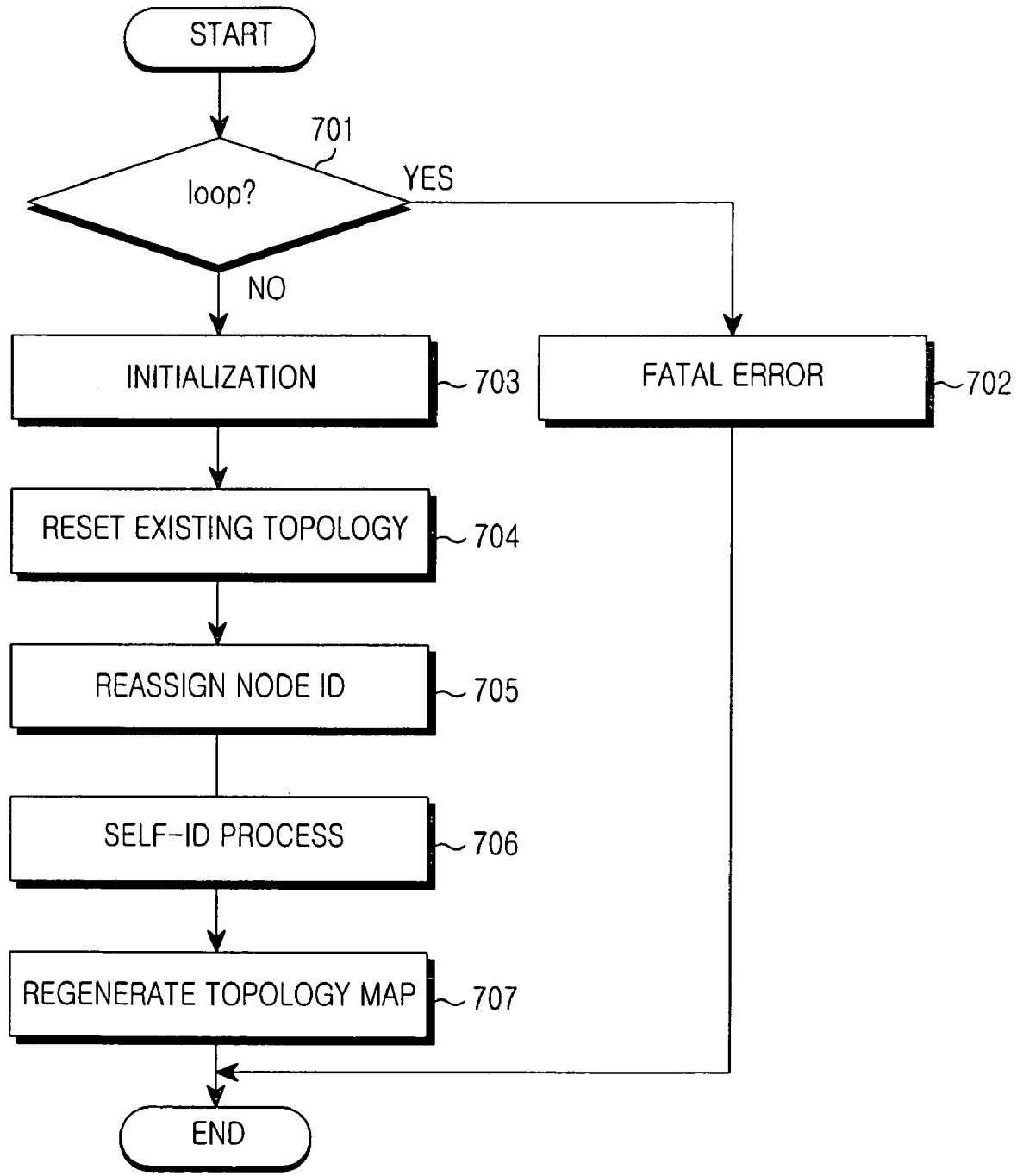
FIG. 7 is a flowchart illustrating a bus reset when a device is removed in the conventional IEEE 1394 daisy-chain configuration.
Figure 8:
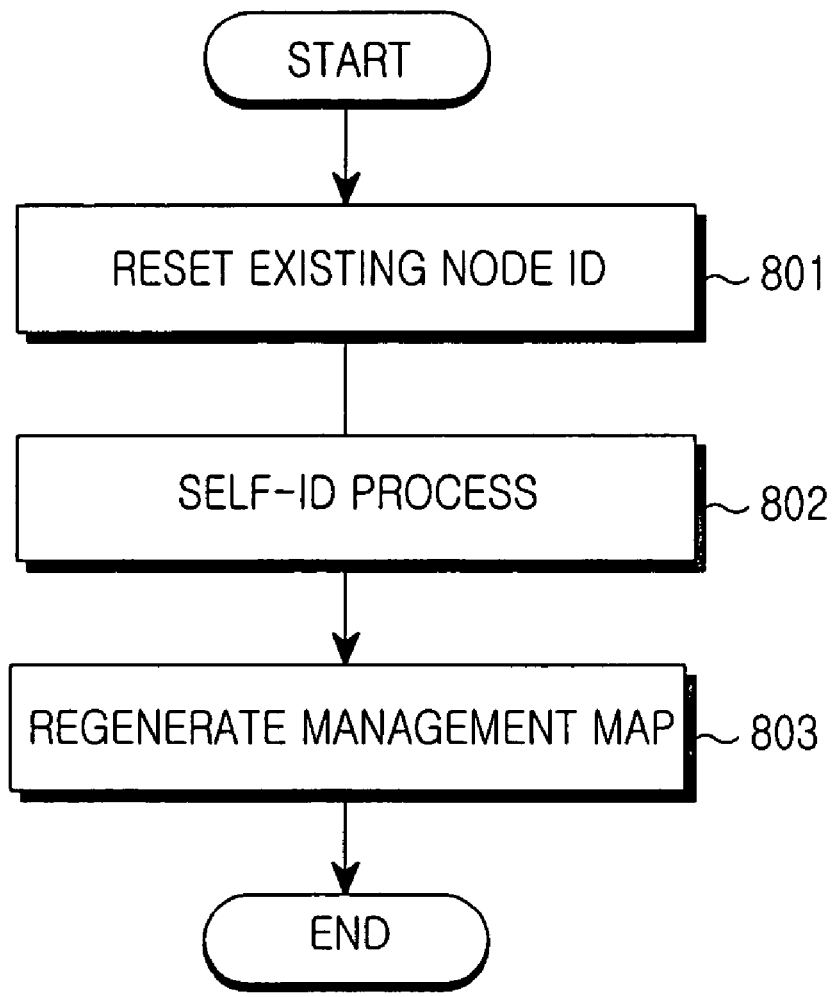
FIG. 8 is a flowchart illustrating a bus reset when a device is removed in the IEEE 1394-based high-rate unidirectional ring system for the indoor backbone network according to the embodiment of the present invention.

FIG. 7 is a flowchart illustrating a bus reset when a device is removed in the conventional IEEE 1394 daisy-chain configuration, and FIG. 8 is a flowchart illustrating the bus reset process when a device is removed in the IEEE 1394-based high-rate unidirectional ring system for the indoor backbone network according to the embodiment of the present invention.

Briefly, according to the conventional bus reset referring to FIG. 7, it is first determined whether the topology is a loop in step 701. In the case of a loop, a fatal error is announced in step 702 and the procedure is terminated. On the contrary, if the topology is not a loop, an initialization is performed in step 703, the existing topology is reset in step 704, and node IDs are reassigned in step 705.

A Self ID process is then performed by the operations related to physical IDs, node IDs, communication rate, port states, connection states, and power on/off state in step 706, and thus a topology map is regenerated in step 707.

However, in accordance with the present invention, as illustrated in FIG. 8, the bus reset incurred by the removal of a device is carried out by resetting existing node IDs in step 801, performing a Self ID process for assigning node IDs, bandwidths, and channel numbers, and checking connection states in step 802, and finally regenerating a management map in step 803.

As illustrated in FIG. 8, fewer SP addition/removal-caused events occur in the inventive backbone network, and the influences of the events in a cluster network under an SP are blocked by the SP. Since an SP can be added/removed by a user request, the conventional bus reset can be performed without the unnecessary steps of checking a root node, leaf nodes, and branch nodes, the bus reset due to the design of the built-in unidirectional ring system.

Figure 9:
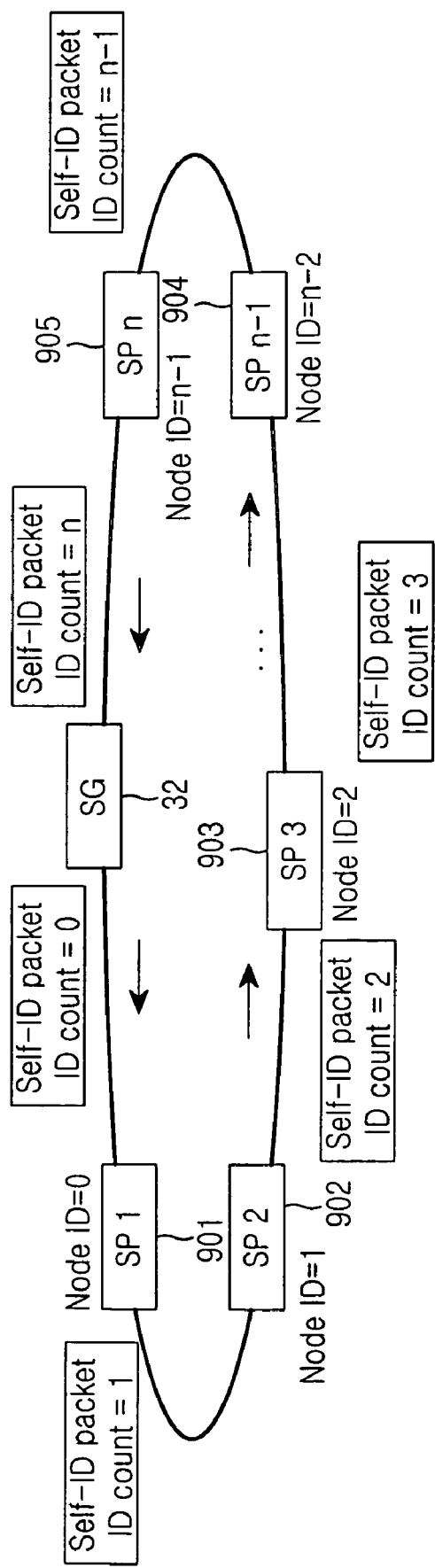
FIG. 9 depicts a node ID assignment in the IEEE 1394-based high-rate unidirectional ring system according to the embodiment of the present invention.

FIG. 9 depicts a node ID assignment in the IEEE 1394-based unidirectional ring system according to the embodiment of the present invention.

As stated in connection with FIG. 8, a backbone network is built mainly using an SG and SPs. However, if an SP is added or removed by a user, a bus reset occurs. Assignment of a node ID to each SP in relation to the bus reset is illustrated in FIG. 9.

If the whole backbone network is turned off, the network install state is changed and then the backbone network is turned on. The bus reset process of recognizing an added/removed SP and assigning IDs to all SPs in the backbone network is needed. Since the SG 32 is fixed as a root node, there is no need for carrying out a bus initialization and tree ID process for designating the peer nodes discriminately as a parent node and child nodes as defined in the IEEE 1394 standard. Notably, the process of checking physical connections to other nodes is performed in conjunction with the Self ID process for assigning a node ID to each SP.

The Self ID process of the present invention is easy and simple relative to the counterpart in the conventional IEEE 1394 tree structure. This is because the SG 32 and an SP being a child node to the SG 32 are already built-in, so they are on state all the time, and the unidirectional ring configuration, unlike the tree topology, renders all SPs 901 to 905 equal in rank, except for the SG 32.

In other words, the complicated process for discriminating a parent node from child nodes that occurs in the tree topology is eliminated. The bus reset event is seldom generated in the built-in environment, and the SG 32 alone plays all the roles of a CM (Clock Master), IRM (Isochronous Resource Master), BM (Bus Master), and PM (Physical Master). Hence, there is no need for defining nodes to perform the above functions in accordance with the teachings of the present invention.

Referring to FIG. 9, in the Self ID process of assigning a node ID to each SP, as a bus reset starts, the SG 32 broadcasts a Self-ID packet and sequentially assigns node IDs to the SPs 901 to 905 starting from the SP 901 by setting its node ID to 0, while increasing a Self-ID packet ID count by 1 for each SP. When the Self-ID packet returns to the SG 32 around the unidirectional ring structure, the SG 32 checks the Self-ID packet ID count and determines how many SPs are connected. If the Self-ID packet does not return until the time that the sum of delays in the respective nodes elapses, the SG 32 may consider that some connection in the unidirectional ring is wrong.

Figure 10:
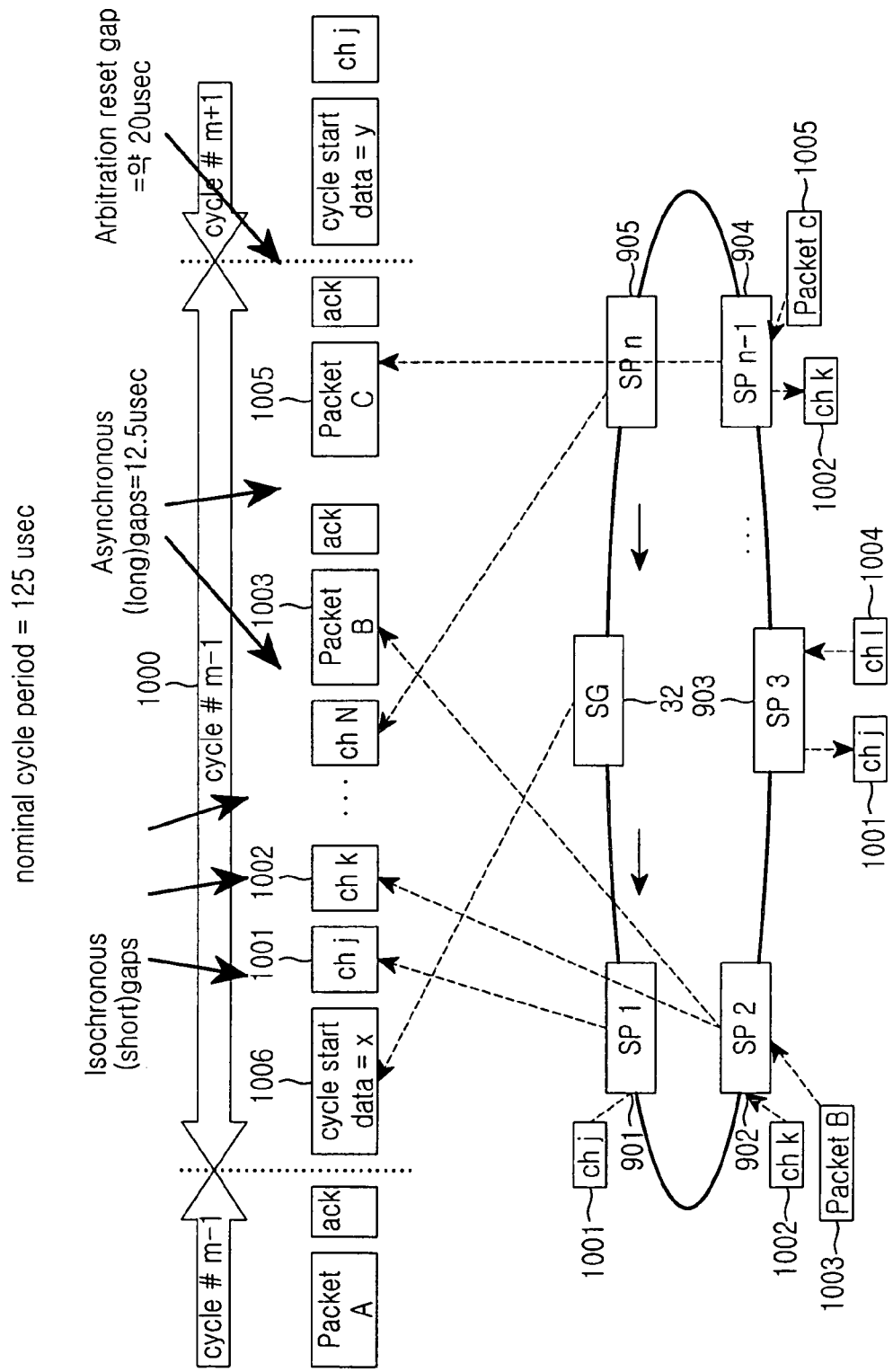
FIG. 10 depicts data transmission in the IEEE 1394-based high-rate unidirectional ring system according to the embodiment of the present invention.

FIG. 10 depicts data transmission in the IEEE 1394-based unidirectional ring system according to the embodiment of the present invention.

In general, one cycle is basically 125 μs and transmission layers are defined by such multiplies as s100, s200, s400, s800, s1600 and s3200 in the IEEE 1394. Within one cycle, there exist an isochronous stream area that can occupy up to 80% of the cycle and an asynchronous data area that can occupy 20 to 100% of the cycle.

The isochronous data is broadcast in the unidirectional ring network as in the conventional IEEE 1394 transmission, minimizing delay at each node. That is, the data directed in a single direction within the ring network is allowed to be copied at nodes and thus it is not cleared. In addition, the data, when it arrives at a source node, is updated, loaded on its channel, and transmitted again in the ring network. Each of the SPs 901 to 905 can be assigned to a predetermined area of the isochronous data area according to a command from the SG 32 and channelizes its data in the assigned area. The maximum number of channels is 63 equal to that of nodes dependent on one bus.

The data transmission according to the present invention follows the existing IEEE 1394 transmission scheme in which each node accesses for transmission basically by taking a measure of a gap time, as illustrated in FIG. 10.

However, each SP acquires one synchronous or asynchronous transmission access in a round robin fashion in view of the nature of the unidirectional ring structure. Therefore, unless an asynchronous data area is preset for the SP, the SP cannot transmit asynchronous data immediately after the transmission of an isochronous packet in one cycle. Therefore, the IRM divides one cycle into an isochronous area and an asynchronous area so that each SP acquires a transmission access by sensing an asynchronous interval from the start of the asynchronous area. In addition, to continue a stable service without influence on the network from a change in an SA or its lower device, the change (i.e., of the SA connected to an SP) is automatically notified to the IRM of the SG 32 even if a bus reset does not occur.

In the present invention, this is defined as an IRC process and the IRC process will be described later with reference to FIGS. 11, 12 and 13.

As illustrated in FIG. 10, one cycle is basically 125 μs and asynchronous packets are transmitted in the same manner of transmission and arbitration in the conventional IEEE 1394 tree topology.

An asynchronous packet is transmitted through arbitration between a source SP and a destination SP. In this asynchronous data area, IP data can be transmitted. The asynchronous data area occupies 20% to 100% of the afore-described IEEE 1394 frame. However, the isochronous data area is higher in priority than the asynchronous data area. Therefore, if real-time data traffic is increased and occupies the maximum isochronous data area of 100-μs (80%), the remaining 20% area (25 μs) is available as the asynchronous data area.

Referring to FIG. 10, the SG 32 announces the start of a cycle 1000, as denoted by reference numeral 1006, and each SP encapsulates or extracts isochronous data and asynchronous data in or from the cycle. Reference numerals 1001 and 1002 denote isochronous data, and reference numerals 1003 and 1005 denote asynchronous data.

Similarly to the conventional IEEE 1394 transmission, the asynchronous data transmission is carried out by sensing a subaction gap time in the present invention. Yet, an identical gap time other than gap times set for different data types is commonly applied to all SPs as compared to the IEEE 1394 tree topology in which the gap time is determined for individual SPs, relying on a gap counter. That is, the gap time for a synchronous data is longer than the isochronous gap time, 0.05 µs and shorter than an arbitration reset gap of about 12.5 µs. In the present invention, it is 12.5 µs for illustrative purposes.

When measuring packet gaps and finding an asynchronous gap, each SP gets its own transmission chance and transmits only one asynchronous packet for a fairness interval within a 125-µs cycle.

Figure 11:
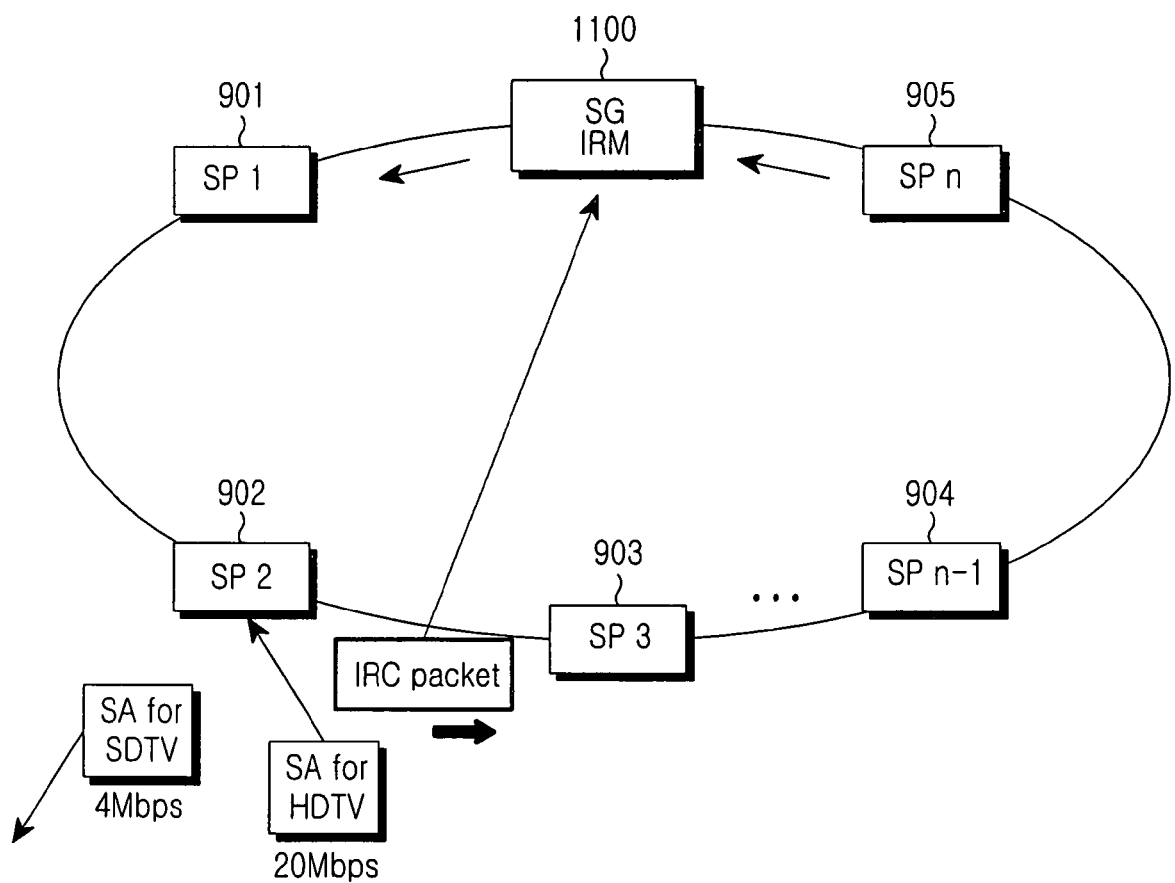
FIG. 11 depicts an IRC (Isochronous Resource Change) procedure according to the embodiment of the present invention.

FIG. 11 depicts an IRC process according to the embodiment of the present invention.

The unidirectional ring system of the present invention is provided with fixed SPs and detachable SAs to prevent the influence of device addition on an ongoing service whenever the device addition occurs.

For this implementation, in addition to the Self-ID process for transmitting information about each SP to the IEM of the SG 32 by a Self-ID packet and assigning channels and bandwidths to the SPs in a bus reset, the process for reporting a change in an SA or its underlying cluster network to the IRM of the SG 32 even during a service and receiving a command about a bandwidth from the IRM is further required.

In the IRC process, an SP recognizes a service change event from an SA, stores information about the change of the cluster network, and transmits the change information to the SG 32 by an asynchronous packet through asynchronous packet arbitration.

As illustrated in FIG. 11, the SP 902 transmits a write request packet about an IRC, which is not specified in the IEEE 1394 standard, to the SG 32 and related operations are performed, in a split transaction. FIG. 12 illustrates the format of an IEEE 1394 QWRq packet used as an IRC packet.

The IRC packet takes the format of the IEEE 1394 QWRq packet, indicating an IRC packet by a reversed value, 0×C(h) in a "tCode" field 1204 so that the PHY and LLC units of the SG 32 can know that it is a packet destined for the IRM.

Figure 12:
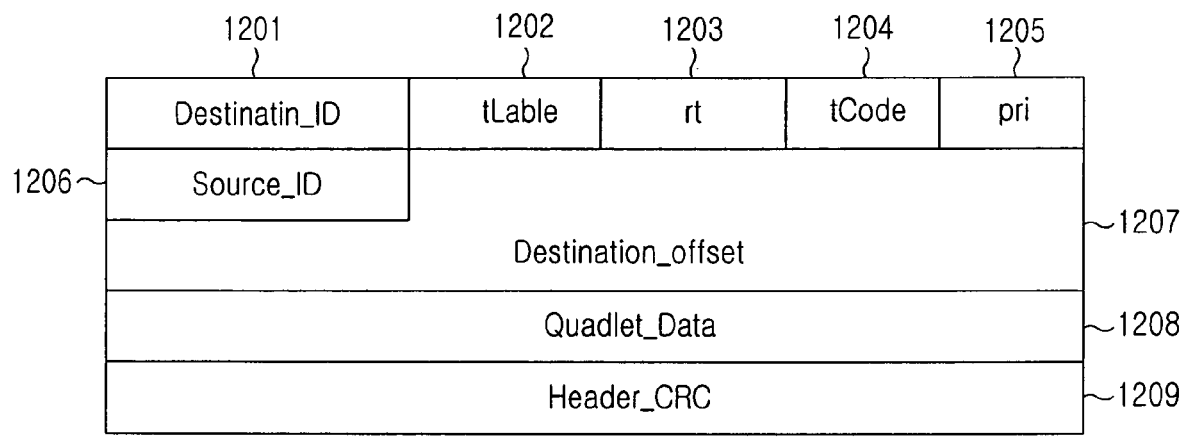
FIG. 12 illustrates the format of an IEEE 1394 QWRq (Write Request for Data Quadlet) packet used as an IRC packet according to the embodiment of the present invention.

Referring to FIGS. 11 and 12, if an SDTV (Standard Definition Television) SA is replaced with an HDTV (High Definition Television) SA in the SP 902, the SP 902 directly notifies the SG of the SA replacement by an IRC packet without a bus reset.

In the IRC process, the channel number assigned to each SP is maintained, while a bandwidth is newly assigned to the SP. Since the changed bandwidth must not exceed a maximum available isochronous bandwidth, the SG 32 notifies the SP whether the use of the channel is acknowledged or negative-acknowledged in the split transaction.

Figure 13:
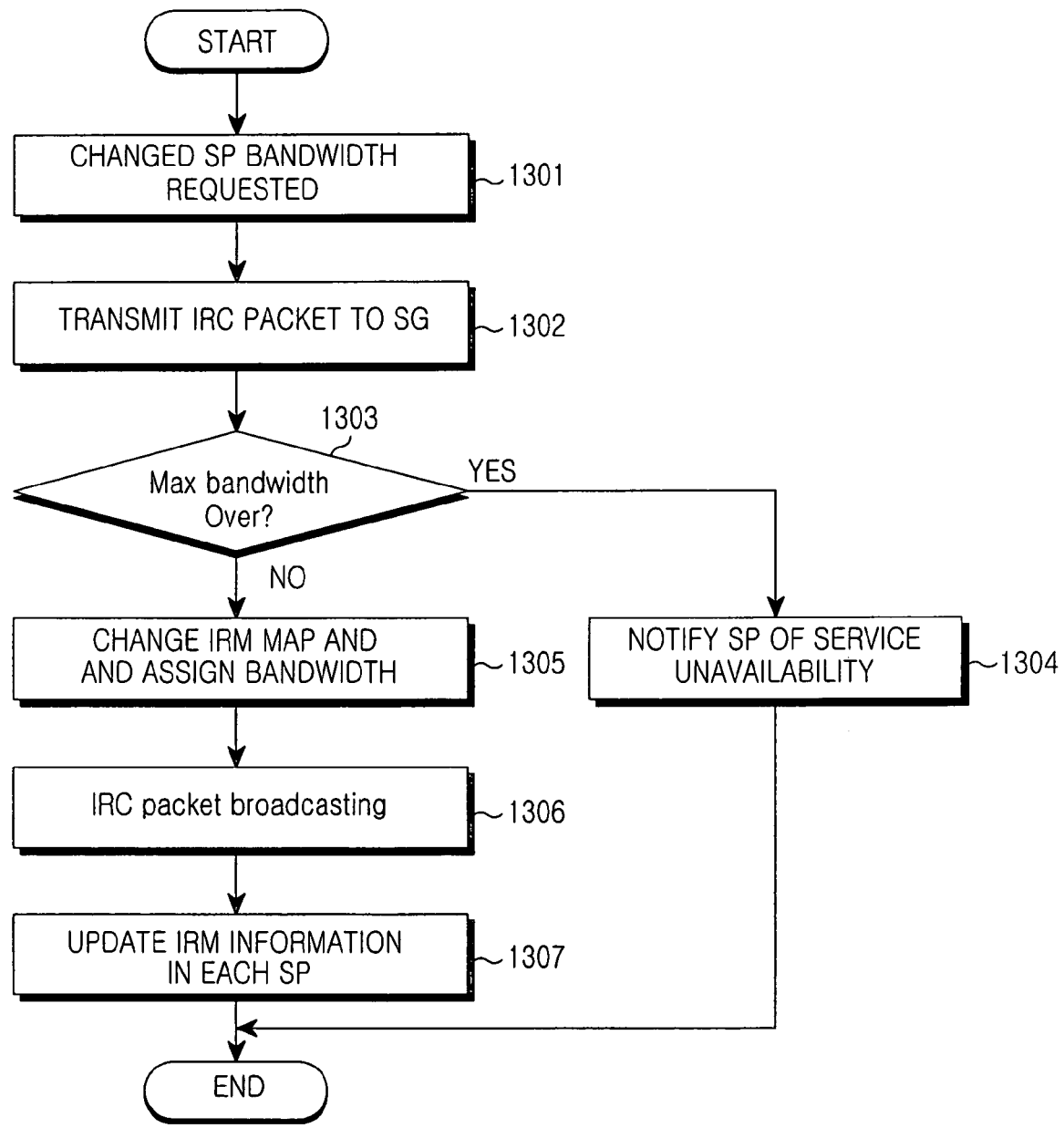
FIG. 13 is a flowchart illustrating the IRC procedure in the IEEE 1394-based high-rate unidirectional ring system according to the embodiment of the present invention.

FIG. 13 is a flowchart illustrating the IRC process in the IEEE 1394-based high-rate unidirectional ring system according to the embodiment of the present invention.

The SG 32 functioning as a CM renders each SP to be synchronized by transmitting a cycle start packet every 125 µs. While an isochronous channel number and a bandwidth are assigned to the SP by the IRM in the Self-ID process in the conventional IEEE 1394 tree topology, the IRC process can be performed during a service according to the present invention.

Referring to FIG. 13, if an SA is replaced in a particular SP, the SP's requested bandwidth is changed in step 1303 and the SP transmits an IRC packet to the IRM of the SG in step 1302.

It is determined whether the requested bandwidth is equal to or greater than a maximum available bandwidth in step 1303. If the requested bandwidth is equal to or greater than the maximum available bandwidth, the SG notifies the SP that the service is unavailable to the SP in step 1304.

On the contrary, if the requested bandwidth is smaller than the maximum available bandwidth, an IRM MAP is changed and the new bandwidth is assigned to the SP in step 1305.

In step 1306, an IRC packet containing new bandwidth information is broadcast to the SPs in step 1306 and the SPs update their respective IRM information based on the IRC packet in step 1307.

When the IRM of the SG determines a channel and a bandwidth for the SA of each SP in the above process, the SP is synchronized to the cycle start packet, acquires its transmission access by sensing an isochronous gap as in the IEEE 1394 tree topology, and transmits an isochronous packet. The isochronous packet starting from one SP goes around the unidirectional ring. An SP copies necessary data in its buffer by checking channel numbers. When the packet returns to the SP, the SP updates it with successive data. The isochronous channel for each SP is maintained unless a bus reset occurs in the unidirectional ring.

The above-described method may be implemented as a program and stored in a computer-readable recoding medium (e.g. CD ROM, RAM, floppy disk, hard disk, opto-magnetic disk, etc.).

The present invention as described above offers the following benefits.

(1) The present invention provides an IEEE 1394-based indoor backbone network of a unidirectional ring topology using SPs, thereby enabling the configuration of a home network that is independent of services and events.

(2) A home backbone network is built according to the high-rate IEEE 1394 which is expected to be adopted as a standard interface for future multimedia devices. Therefore, the home backbone network is compatible with future multimedia electronic appliances.

(3) The present invention provides a built-in ring topology backbone network with no devices connected in a daisy-chain fashion, increasing user friendliness.

(4) A novel unidirectional ring topology is proposed, which is improved from the conventional IEEE 1394 tree topology. Therefore, whole system building cost is reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An unidirectional ring system used in an indoor backbone network, comprising:
   a residential gateway (RG) for connection to an external large-capacity network;
   a service gateway (SG) coupled to the RG for serving as a clock master to synchronize clock signals in the system, for managing traffic and buses in the indoor backbone network, and for monitoring the physical states of transmission lines in the indoor backbone network;

a plurality of service platforms (SPs) for exchanging user data between a user and the indoor backbone network, and a detachable service adapter (SA), which is coupled to a device servicing each user, in each of the SPs, for connecting a user cluster network with a corresponding SP and providing various services to the user, wherein the SG and the plurality of SPs serve as each node and form a unidirectional ring structure, and each of the SPs is configured to connect its respective SA to the backbone network so that an event and a service do not influence the backbone network.

2. The unidirectional ring system of claim 1, wherein a self-ID process is performed to assign node IDs to the SPs when a change in an SP causes a bus reset, the Self-ID process including the steps of:

initiating the bus reset due to the SP change;

broadcasting a Self-ID packet from the SG to the SPs;

sequentially assigning node IDs to the SPs according to the Self-ID packet, while increasing an ID count in the Self-ID packet each time a node ID is assigned to an SP; and, performing an error-related operation if the Self-ID packet generated from the SG does not return to the SG until a total time of delays in the respective SPs elapses.

3. The unidirectional ring system of claim 2, wherein the SG checks the number of the SPs according to the ID count of the Self-ID packet.

4. The unidirectional ring system of claim 1, wherein priority levels for transmission of asynchronous data are assigned to the SPs so that the SPs can transmit asynchronous data according to the priority levels.

5. The unidirectional ring system of claim 4, wherein a gap time required for processing a logical ink control (LLC) unit in each of the SPs is set between IEEE 1394 frames transmitted by the backbone network.

6. The unidirectional ring system of claim 1, wherein an IRC (Isochronous Resource Change) process is performed to report a change in an SA to the SG without the SA change influencing an ongoing service when the SA change occurs, the IRC process including the steps of:

transmitting an IRC packet requesting assignment of a bandwidth from an SP having the SA to an IRM (Isochronous Resource Master) of the SG;

comparing the requested bandwidth with a maximum available bandwidth in the SG;

notifying the SP that a service is unavailable to the SP by the SG if the requested bandwidth is equal to or greater than the maximum available bandwidth;

changing an IRM map and assigning the requested bandwidth to the SP by the SG if the requested bandwidth is smaller than the maximum available bandwidth;

broadcasting an IRC packet containing information about the new bandwidth from the SG to the SPs; and, updating IRM information in the SPs.

7. The unidirectional ring system of claim 6, wherein the IRC packet is a QWRq (Write Request for Data Quadlet) packet defined in an IEEE 1394 standard, with a reserved value in a tCode field set to indicate an IIRC packet.

8. The unidirectional ring system of claim 1, wherein the system is an IEEE 1394-based indoor backbone network.

9. The unidirectional ring system of claim 1, the plurality of SPs serves as a child node to the SG.

\* \* \* \* \*